United States Patent
Faez et al.

(10) Patent No.: US 8,316,111 B2
(45) Date of Patent: Nov. 20, 2012

(54) SYSTEMS AND METHODS FOR PLACING AND DRAGGING PROGRAMMATIC PACKAGES IN CLUSTERED COMPUTING SYSTEMS

(75) Inventors: Farid Faez, Sunnyvale, CA (US); Eric Soderberg, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1492 days.

(21) Appl. No.: 11/248,873

(22) Filed: Oct. 11, 2005

(65) Prior Publication Data
US 2007/0083603 A1    Apr. 12, 2007

(51) Int. Cl.
*G06F 15/177*    (2006.01)
(52) U.S. Cl. .................. 709/220; 709/221; 709/222
(58) Field of Classification Search .......... 709/220–222; 707/1, 100
See application file for complete search history.

(56) References Cited

U.S. PATENT DOCUMENTS

| | | | |
|---|---|---|---|
| 5,566,297 A * | 10/1996 | Devarakonda et al. | 714/15 |
| 6,847,970 B2 * | 1/2005 | Kar et al. | 707/100 |
| 6,990,593 B2 * | 1/2006 | Nakagawa | 713/300 |
| 2003/0018927 A1 * | 1/2003 | Gadir et al. | 714/4 |
| 2003/0195757 A1 * | 10/2003 | Greenstein | 705/1 |
| 2005/0038801 A1 * | 2/2005 | Colrain et al. | 707/100 |
| 2005/0273456 A1 * | 12/2005 | Revanuru et al. | 707/1 |

OTHER PUBLICATIONS

Hung, P.C.K, From Conflict of Interest to Separation of Duties in WS-Policy for Web Services Matchmaking Process; System Sciences, 2004. Proceedings of the 37th Annual Hawaii International Conference on Jan. 5-8, 2004: 10 pp.*

Jiehan Zhou et al., Web Service in Context and Dependency-Aware Service Composition; Asia-Pacific Service Computing Conference, The 2nd IEEE on Dec. 11-14, 2007 pp. 349-355.*

* cited by examiner

*Primary Examiner* — Peter Shaw

(57) ABSTRACT

The invention provides methods of placing programmatic packages in a clustered environment.

An exemplary method of placing programmatic packages in response to a state change in a clustered computing system is presented including: receiving the state change; in response to receiving the state change, ordering programmatic packages, where each of the programmatic packages is configured with a package priority, the package priority representing a user designated assignment of programmatic importance from high to low; placing the programmatic package having a highest package priority on a configured node, the configured node included as part of the clustered computing system; and for each of a remaining programmatic packages, placing each of the remaining programmatic packages on a node set in accordance with a user-specified package dependency, the node set included as part of the clustered computing system.

2 Claims, 10 Drawing Sheets

SYSTEMS AND METHODS FOR PLACING AND DRAGGING PROGRAMMATIC PACKAGES IN CLUSTERED COMPUTING SYSTEMS

CROSS REFERENCE TO RELATED APPLICATIONS

The present invention is related to the following application, all of which is incorporated herein by reference:

Commonly assigned application entitled "METHODS AND SYSTEMS FOR FORECASTING OPERATIONAL STATUS OF CLUSTERED COMPUTING SYSTEMS," filed on even date herewith by the same inventors herein Ser. No. 11/248,468.

BACKGROUND

With the evolution and proliferation of computer systems and computer networks, modern users have come to rely on technical systems that were once thought of as luxuries. Reliable data service with 24-hour access has become expected and relied upon by Internet users across the globe. Email, chat, online sales, data access, and other related data services have become part of the daily routine of millions of people throughout the world.

As a result of the tremendous pressure placed on companies to deliver reliable data services, many strategies have been implemented to assure continuous access such as data mirror sites, multiple redundant systems, clustered computing systems, and the like. In particular, clustered computing systems are being utilized by many data service providers for critical services. Clustered computing systems may be accomplished by connecting two or more computers together in such a way that they behave like a single computer. Clustering may be used for parallel processing, load balancing, and fault tolerance. Clustering is a popular strategy for implementing parallel processing applications because it enables companies to leverage an investment already made in PCs and workstations. In addition, in some examples, it's relatively easy to add new CPUs simply by adding a new PC to the network.

In the past, companies tended to run on a handful of computers executing relatively simple software. This made it easier to manage the systems and isolate problems. But in the present networked computing environment and particularly in clustered systems, information systems can contain hundreds of interdependent services and applications also known as programmatic packages. Configuring programmatic packages, where interdependence between applications and hardware is a critical element, can be a daunting and complex task. In present examples, network administrators may utilize a variety of software tools to configure programmatic packages. However, difficulties can arise during system operations.

System state changes may include changes in resource availability for example. Typically, when a system state change occurs, a flag or notification may be sent to a network administrator. The network administrator may then diagnose the system state change and then determine a best course of action. In some instances, some or all hardware or software services may not be readily available. In those instances, configuring programmatic packages in response to system state changes may require selecting those services that are deemed most critical so that those services may be maintained. Selecting services may be particularly difficult to assess especially in complex systems having multiple interdependencies. Further, selecting services on an ad hoc basis can be particularly time consuming and create additional unanticipated problems.

What are needed are systems and methods for establishing and maintaining priority in application package configurations so that desired services may be established or maintained. Furthermore, systems and methods for resolving interdependence issues may result in further networking efficiencies. Therefore, systems and methods for placing and dragging programmatic packages in clustered computing systems are provided herein.

SUMMARY

The invention provides methods of placing programmatic packages in a clustered environment that may be deployed across computer network systems and environments that may function in conjunction with a wide range of hardware and software configurations.

An exemplary method of placing programmatic packages in response to a state change in a clustered computing system is presented including: receiving the state change; in response to receiving the state change, ordering programmatic packages, where each of the programmatic packages is configured with a package priority, the package priority representing a user designated assignment of programmatic importance from high to low; placing the programmatic package having a highest package priority on a configured node, the configured node included as part of the clustered computing system; and for each of a remaining programmatic packages, placing each of the remaining programmatic packages on a node set in accordance with a user-specified package dependency, the node set included as part of the clustered computing system. In some embodiments, the state change includes: a package failure, a node failure, a cluster failure, a system failure, a hardware failure, a software failure, a network failure, a system command, and a state change command. In some embodiments, the method further includes assigning a user-specified package dependency to each programmatic package. In some embodiments, the user-specified package dependencies include: a same node exclusion dependency, an all node exclusion dependency, a same node up dependency, an any node up dependency, and a different node up dependency.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. An apparatus may include a processor for accessing and executing computer-readable instructions that are stored on computer readable medium.

Figure 1:
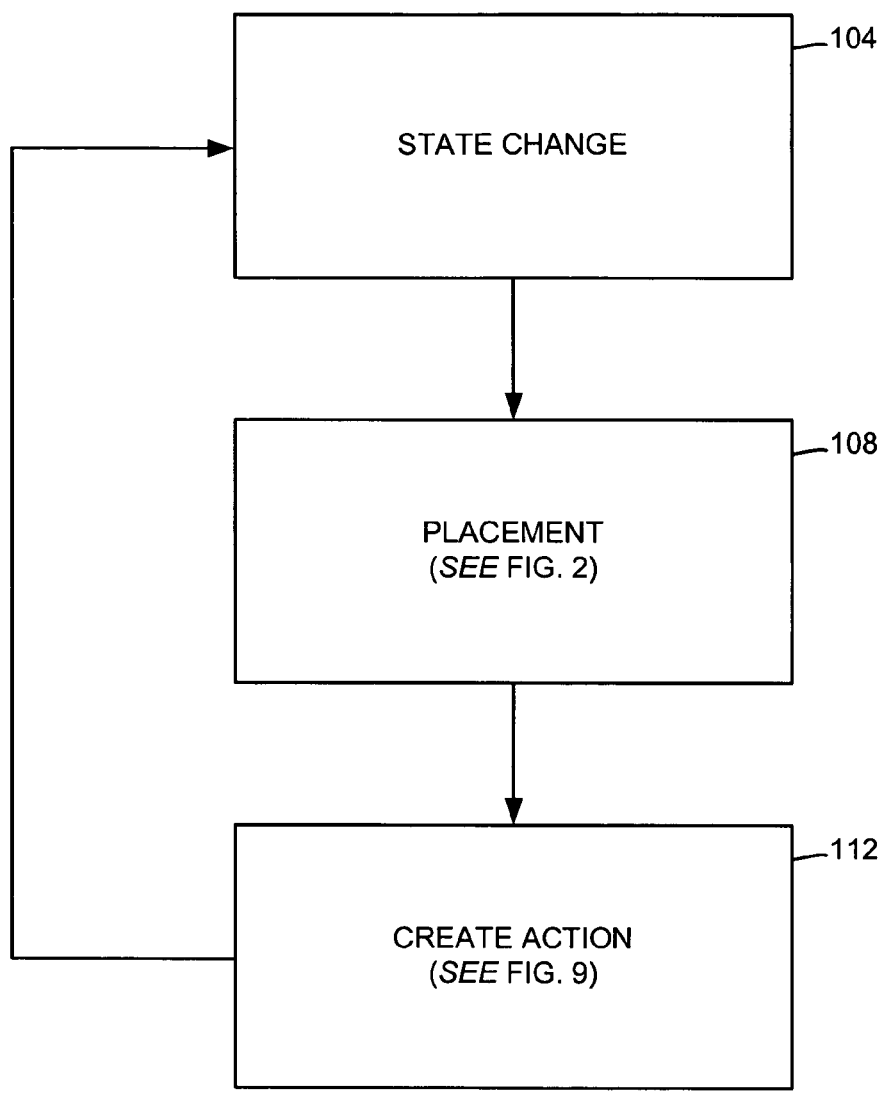
FIG. 1 is a diagrammatic system overview in accordance with embodiments of the present invention.

FIG. 1 is a diagrammatic system overview in accordance with embodiments of the present invention. In particular, as illustrated, the invention contemplates at least three general functional blocks that may be iterated indefinitely for a given system. At a first functional block 104, a state change is contemplated. A state change refers to a change in the state of a cluster in embodiments of the present invention. State changes may include, for example: a package failure; a node failure; a cluster failure; a system failure; a hardware failure; a software failure; a network failure; a system command; and a state change command. These examples are intended to illustrate types and natures of state changes and are not intended to be limiting. One skilled in the art will readily recognize that many other state changes are possible.

At a next functional block 108, a placement module for placing programmatic packages in accordance with user-specified dependencies is contemplated. Placement is discussed in further detail for FIGS. 2-11 below. In general, placement is a process by which a programmatic package (package) may be placed on a functioning node in a clustered computing system. In some embodiments, a node may be part of a node set in a clustered computing system. In some embodiments, a package may be dragged from one node to another node during placement. In some embodiments, package priority and user-specified package dependencies may be utilized to effect placement. Package priority and user-specified package dependencies are discussed in further detail below. Package priority may be assigned through a configuration module (not shown) in accordance with user preferences. In general, package priority corresponds to a user designated assignment of programmatic importance. Further, in general, user-specified package dependencies define relationships between packages and, in some examples, associated hardware or software requirements.

At a next functional block 112, create action is contemplated. In general, create action is a process by which a placement step is effected. Thus, if, in one example, a package is placed on a node, then create action might start that package on that node. Any number of create actions may be accomplished in embodiments of the present invention. One result of a create action step is a state change thus returning to function 104. In some embodiments, a create action module may be utilized to create action. Create action is discussed in further detail below for FIG. 9.

Figure 11:
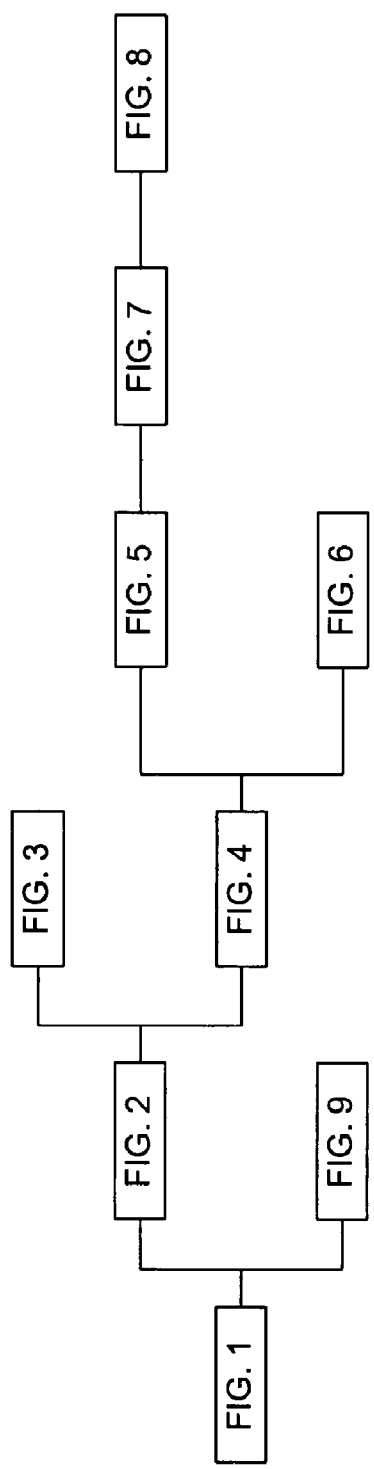
FIG. 11 is a diagrammatic reference to the figures contained herein.

Turning briefly to FIG. 11, which is a diagrammatic reference to the figures contained herein. Because the methods described herein have nested methods, FIG. 11 is provided for clarity only and is not intended to be limiting in any way. As such, FIG. 11 may be useful in understanding the embodiments described herein in providing a roadmap of connections between figures.

Figure 2:
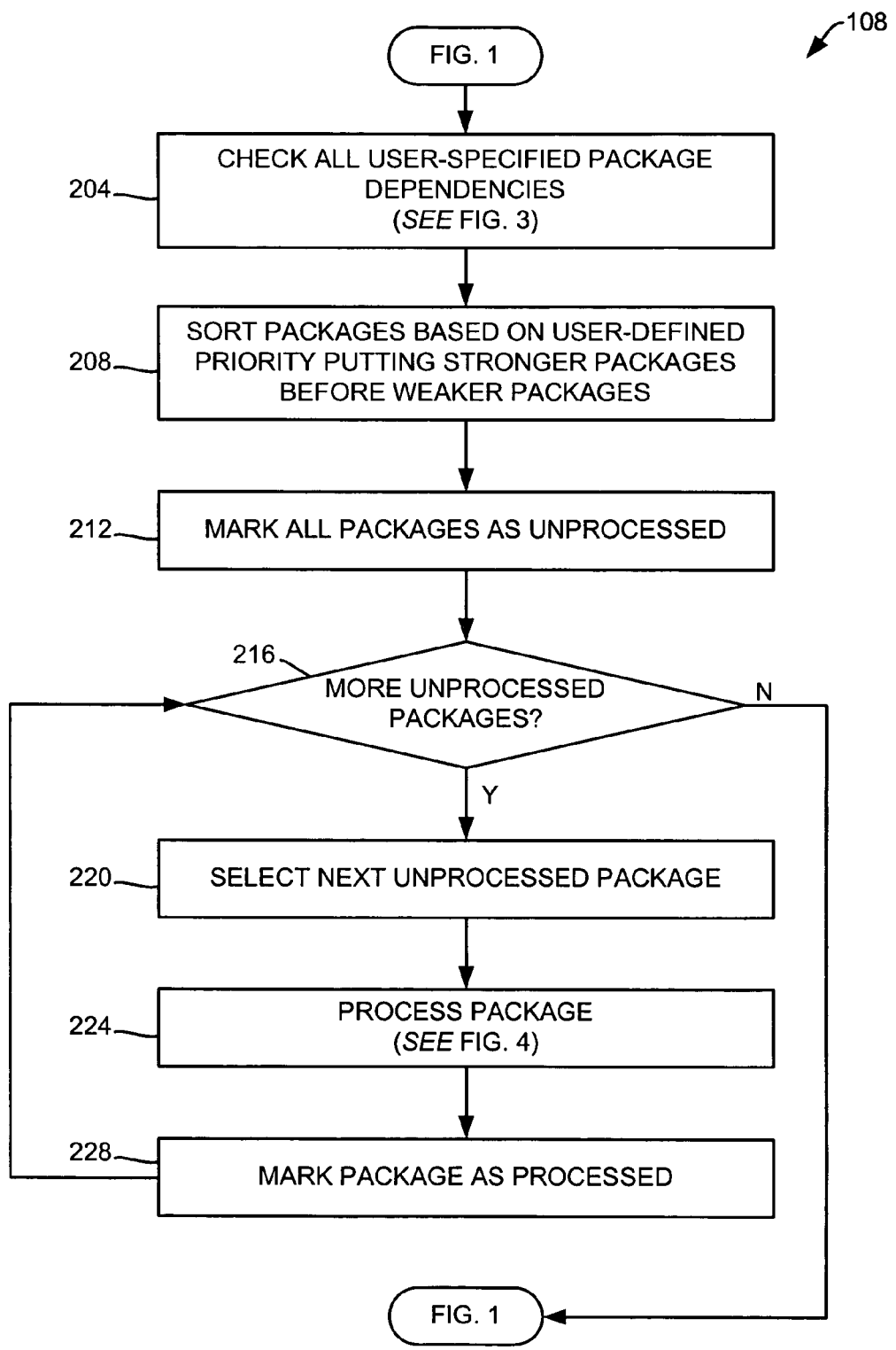
FIG. 2 is a diagrammatic flowchart of methods of placement in accordance with embodiments of the present invention.

FIG. 2 is a diagrammatic flowchart of methods of placement in accordance with embodiments of the present invention. At a first step, 204, the method checks all user-specified package dependencies. Step 204 is discussed in further detail below for FIG. 3. At a next step 208, packages are sorted based on user-defined priority putting stronger packages before weaker packages. Priority describes ascendancy with respect to packages. For example, a user may configure a set of packages on a cluster to provide desired services that might include: a database package, a mail server package, and a query package. In an ideal setting, all packages would be up and running thus providing all desired services. However, if a node failure, for example, occurs, then some or all of the services may not be able to run on remaining nodes. In those instances, it may be useful to assign a priority to each package so that a system may preserve the most critical services. In this example, a high priority may be assigned to the database package while a low priority may be assigned to the query package. Thus, in the event of a node failure, the system will attempt to keep the database package running over the query package. In other embodiments, a package priority may be utilized in cooperation with a user-specified package dependency to effect dragging. Dragging will be discussed in further detail below for FIG. 4 et seq. Thus, a step 208 may return a resulting table of packages in an order based on priority.

At a next step 212, all packages are marked as unprocessed. In this step, each package is flagged as a bookkeeping step. In general, steps 216 through 228 allow the method to iteratively move through a table of packages. Thus, at a step 216 the method determines whether there are more unprocessed packages. If there are unprocessed packages, the method then selects the next unprocessed package at a step 220. The package is processed at a step 224. Step 224 is discussed in further detail below for FIG. 4. Once a package is processed, the method then marks the package as processed at a step 228 whereupon the method returns to a step 216. When all packages have been processed, the method returns to FIG. 1 to create an action.

Figure 3:
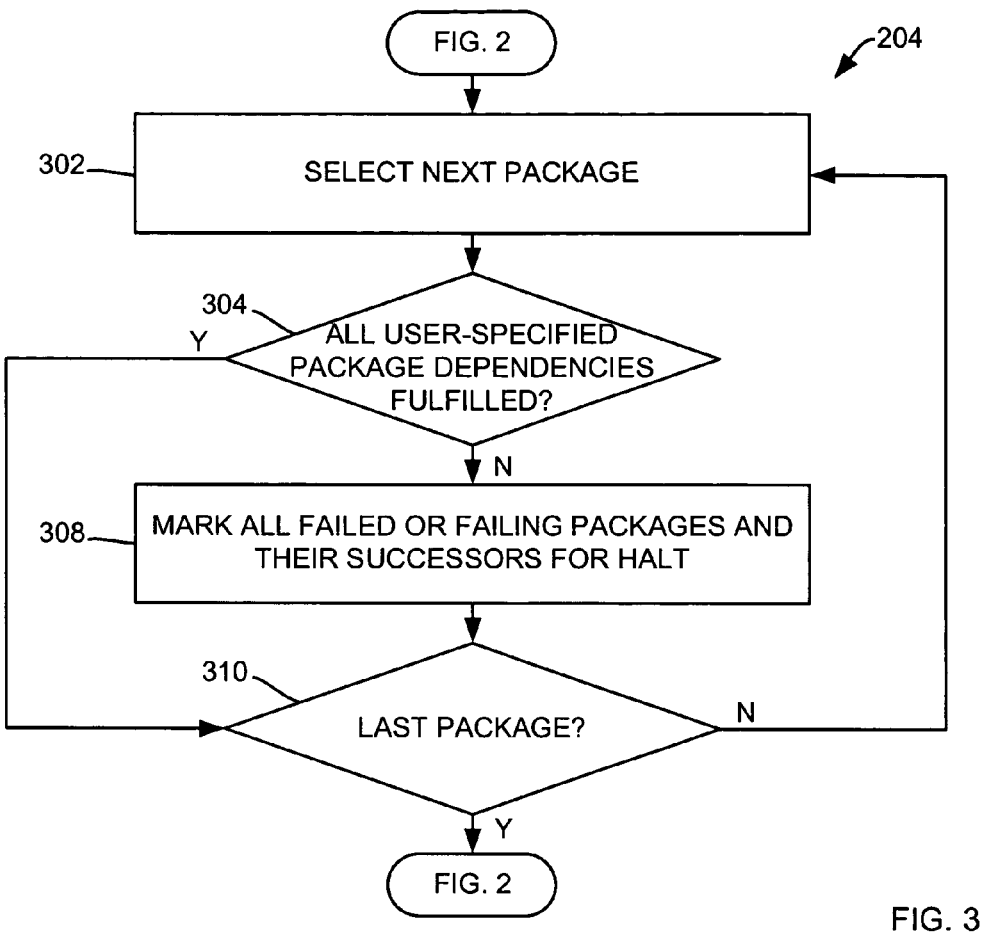
FIG. 3 is a diagrammatic flowchart of alignment with dependency in accordance with embodiments of the present invention.

FIG. 3 is a diagrammatic flowchart of alignment with dependency in accordance with embodiments of the present invention. In particular, FIG. 3 represents a further illustration of a step 204 (see FIG. 2). At a first step 302, a next package is selected. As can be appreciated, in some embodiments, methods described herein evaluate all packages on a system under inspection. At a next step 304, the method determines whether all user-specified package dependencies have been fulfilled. If all user-specified package dependencies have been fulfilled, the method continues to a step 310 to determine whether the last package has been evaluated. If the method determines that all user-specified package dependencies have not been fulfilled, the method marks all failed or failing packages and their successors for halt at a step 308 whereupon the method continues to a step 310 to determine whether the last package has been evaluated. When all packages have been evaluated, the method returns to a step 208 (see FIG. 2).

As noted above, user-specified package dependencies define relationships between packages and, in some examples, associated hardware. For example, a finance package may require a database package to run as in the following illustrative example:

EXAMPLE 1

Finance Package→Database Package

In this example, the finance package depends on the data base package. That is, the data base package must be up and running before the finance package can run. In this instance, the data base package (dependee) is a predecessor of the finance package while the finance package (dependent) is a successor of the data base package. User-specified package dependencies may include other parameters as well. For example, a "same node exclusion" dependency denotes a configuration where packages cannot be brought up on the same node. Thus, there may be hardware or software configurations that do not permit dependent packages to run on the same node. As can be appreciated, user-specified package dependencies can account for specific configurations available to a user. User-specified package dependencies will be discussed in further detail below for FIG. 8.

Therefore, if, at a step 304, the method determines that all user-specified package dependencies have not been fulfilled, the method marks all failed or failing packages and their successors for halt at a step 308. Halting all packages and their successors avoids configuration errors when packages are placed in methods described below. The method then returns to FIG. 2.

Figure 4:
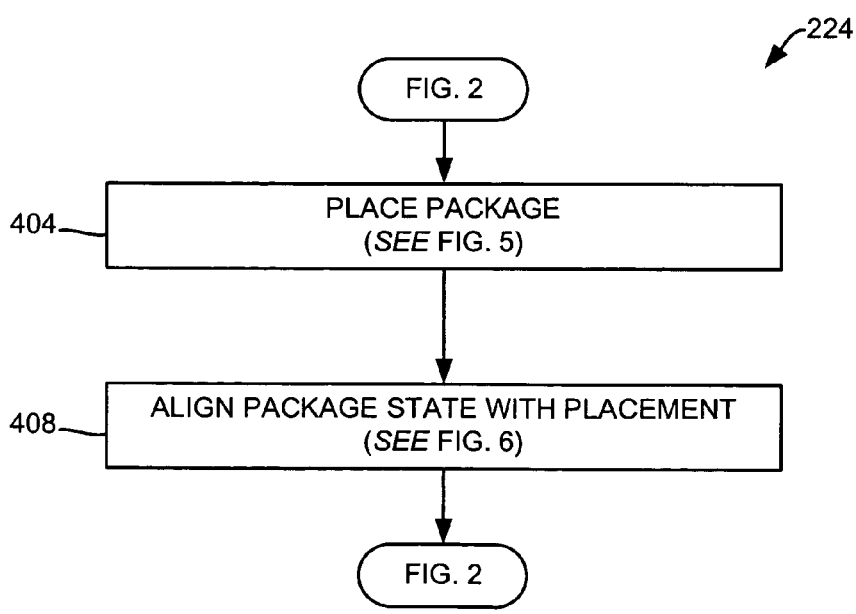
FIG. 4 is a diagrammatic flowchart of methods of placement in accordance with embodiments of the present invention.

FIG. 4 is a diagrammatic flowchart of methods of placement in accordance with embodiments of the present invention. In particular, FIG. 4 represents a further illustration of a step 224 (see FIG. 2). At a first step 404, a package is placed. Package placement is discussed in further detail below for FIG. 5. At a next step 408, package state is aligned with placement. Package alignment is discussed in further detail below for FIG. 6. As noted above, package priority may be utilized in cooperation with a user-specified package dependency to effect dragging. Dragging is a process by which a programmatic package of lower priority may be "dragged" to a node configuration in accordance with an associated programmatic package having a higher priority. In this manner, a user may ensure that a programmatic package and its associated programmatic packages will function in a predictable manner with the necessary resources. In some embodiments, a dragging module may be utilized for dragging programmatic packages. Thus in accordance from results from steps 404 and 408; in some embodiments, a programmatic package may be dragged to a node. In other embodiments, a programmatic package may be dragged to a node to a different node. In other embodiments, a programmatic package may be dragged from a node.

Figure 5:
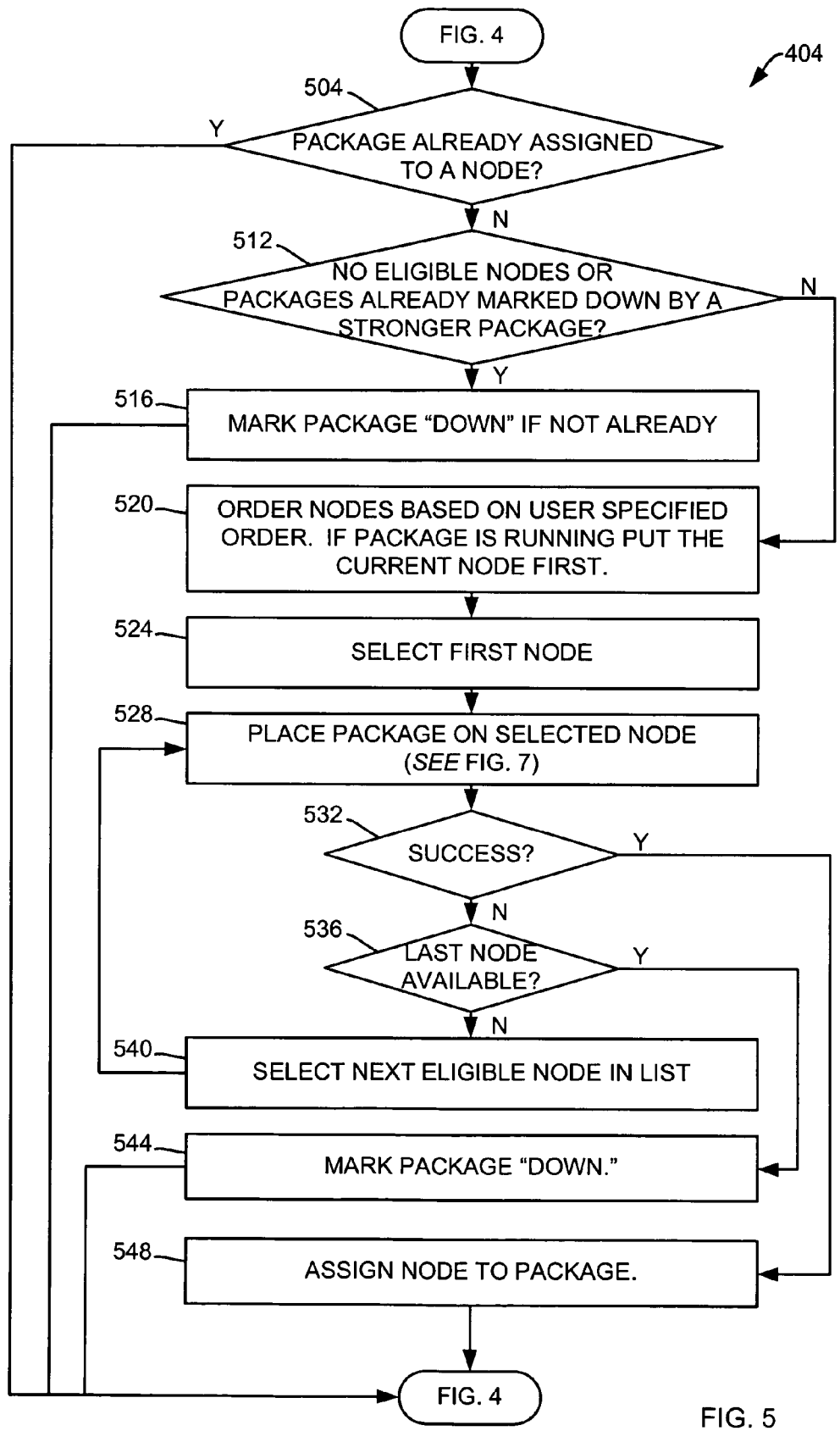
FIG. 5 is a diagrammatic flowchart of methods of placement in accordance with embodiments of the present invention.

FIG. 5 is a diagrammatic flowchart of methods of placement in accordance with embodiments of the present invention. In particular, FIG. 5 represents a further illustration of a step 404 (see FIG. 4). At a first step 504, the method determines whether a package has already been assigned to a node. In some embodiments, packages may have all ready been assigned in an earlier recursion. Thus, if the method determines that a package has already been assigned to a node at a step 504, then the method returns to FIG. 4. If a node has not been assigned, then the method proceeds to attempt to assign a node.

At a next step 512, the method determines whether there are no eligible nodes or whether package are already marked DOWN by a stronger package. Thus, if there are no eligible nodes for a package, the package is marked DOWN at a step 516 whereupon the method continues to FIG. 4. Further, if the package is already marked DOWN, the method continues to FIG. 4. As noted above, package priority generally corresponds to a user designated assignment of programmatic importance. In some instances, a package with a stronger (higher) package priority may require another package to be DOWN. If the conditions set forth at a step 512 are not met, then the method continues to a step 520 to order nodes based on user-specified order. In some embodiments, if a package is currently running, then the current node is favored (i.e. selected first) despite user-specified order.

At a next step 524, the first node of the ordered nodes is selected. As noted, this may, in some embodiments, be the currently running node. Once the first node is selected, a package is placed on the selected node at a step 528. Node selection will be discussed in further detail below for FIG. 7. The method then determines whether placement has been successful at a step 532. If placement is successful (i.e. package was placed on a selected node), the method continues to a step 548 to assign the node to the package whereupon the method returns to FIG. 4. If the method determines that placement is not successful at a step 532, then the method determines whether any more nodes are available at a step 536. If the method determines that more nodes are available at a step 536, then the method continues to select the next eligible node of the ordered nodes at a step 540. The method then iterates to a step 528. In this manner, all assigned nodes may be examined. If the method determines that no nodes are available at a step 536, the method continues to a step 544 to mark package as DOWN whereupon the method continues to FIG. 4.

Figure 6:
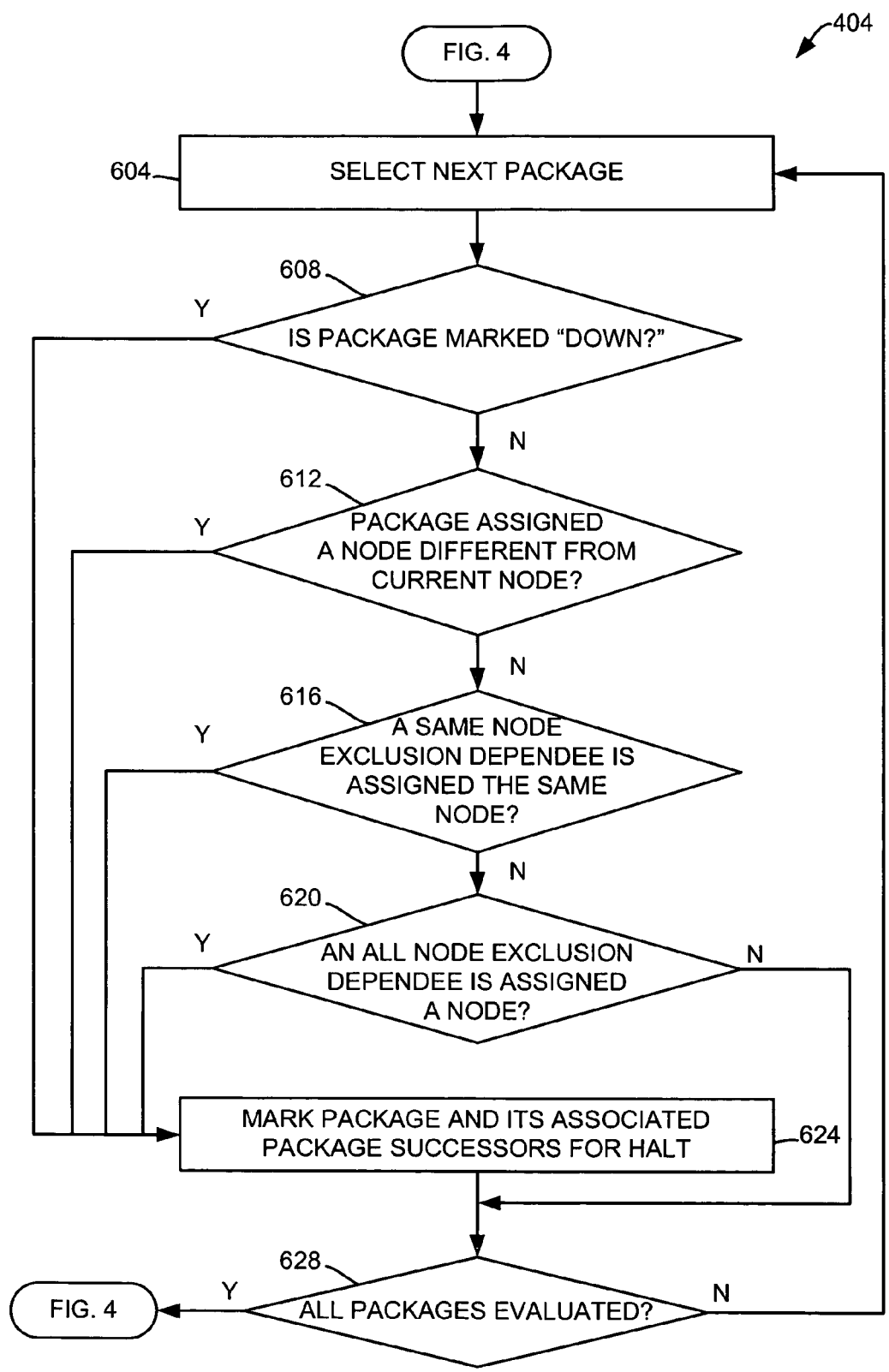
FIG. 6 is a diagrammatic flowchart of methods of alignment in accordance with embodiments of the present invention.

FIG. 6 is a diagrammatic flowchart of methods of alignment in accordance with embodiments of the present invention. In particular, FIG. 6 represents a further illustration of a step 408 where all packages may be examined beginning with a first package (see FIG. 4). At a first step 604, a next package is selected for processing. At a next step 608, the method determines whether the selected package has been marked DOWN as in steps 516 and 544 (see FIG. 5). If the selected package is marked DOWN, the method continues to a step 624 to mark the selected package and all of its associated package successors for halt. If the selected package is not marked DOWN, the method determines whether the selected package is assigned a different node from its currently running node at a step 612. If the selected package is assigned a different node, the method continues to a step 624 to mark the selected package and all of its associated package successors for halt at a step 624. If the selected package is not assigned a different node, the method continues to determine whether a same node exclusive dependee is assigned the same node as the selected package at a step 616.

A "same node exclusion dependency" is a dependency wherein the selected package may not be up on the same node as a package to which it depends or upon which it depends. However, the selected package may be UP on another, different node in the cluster as a package to which it depends or upon which it depends. If the selected package is assigned to the same node as a dependee package, the method continues to mark the selected package and all of its associated package successors for halt at a step 624. If the selected package is not assigned to the same node as a dependee package, the method continues to determine whether an all node exclusion dependee is assigned a node at a step 620.

An "all node exclusion" is a dependency wherein a package requires that an associated package be DOWN on the same cluster. Thus, if a dependee package is running and an all node exclusion dependency exists, then a corresponding dependent package and all of its associated package successors for halt at a step 624. If an all node exclusion dependee is assigned a node, the method continues to mark the selected package and all of its associated package successors for halt. If an all node exclusion dependee is not assigned a node, the method continues to determine whether all packages have been evaluated at a step 628. If all packages have not been evaluated, the method iterates to a step 604. If all packages have been evaluated, the method returns to FIG. 4.

Figure 7:
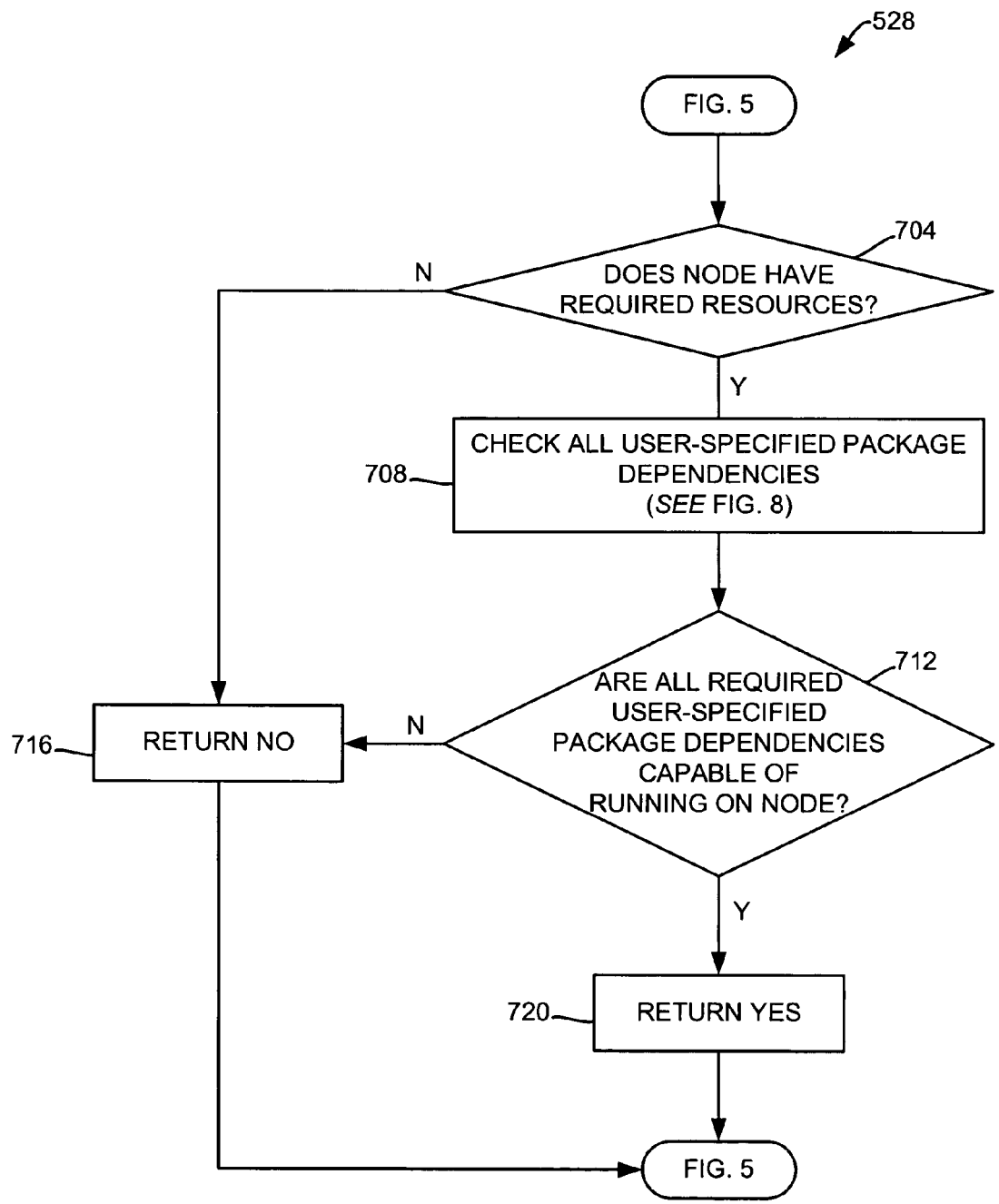
FIG. 7 is a diagrammatic flowchart of methods of placing a programmatic package on a node in accordance with embodiments of the present invention.

FIG. 7 is a diagrammatic flowchart of methods of placing a programmatic package on a node in accordance with embodiments of the present invention. In particular, FIG. 7 represents a further illustration of a step 528 (see FIG. 5). At a first step 704, the method determines whether a node has required resources. Resources may include hardware and software resources without limitation. One skilled in the art will recognize that packages generally have minimum hardware and software requirements in order to function properly. Examples of hardware resources include: network requirements; minimum RAM requirements; hard drive size requirements; processor requirements; and the like. Examples of software resources include operating systems; utilities; drivers; dynamic linked libraries; and the like. In some embodiments, selection of user-specified package dependencies may relate to both hardware and software requirements. If a node does not have required resources, the method returns a no at a step 716 whereupon the method continues to FIG. 5. If a node has required resources, the method continues to a step 708 to check all user-specified package dependencies. Checking all user-specified package dependencies will be discussed in further detail below for FIG. 8.

Once all user-specified package dependencies are checked, the method determines whether all user-specified package dependencies are capable of being fulfilled at a step 712. If all user-specified package dependencies are not capable of being fulfilled, the method returns a no at a step 716 whereupon the method continues to FIG. 5. If all user-specified package dependencies are capable of being fulfilled, the method returns a yes at a step 720 whereupon the method continues to FIG. 5.

Figure 8:
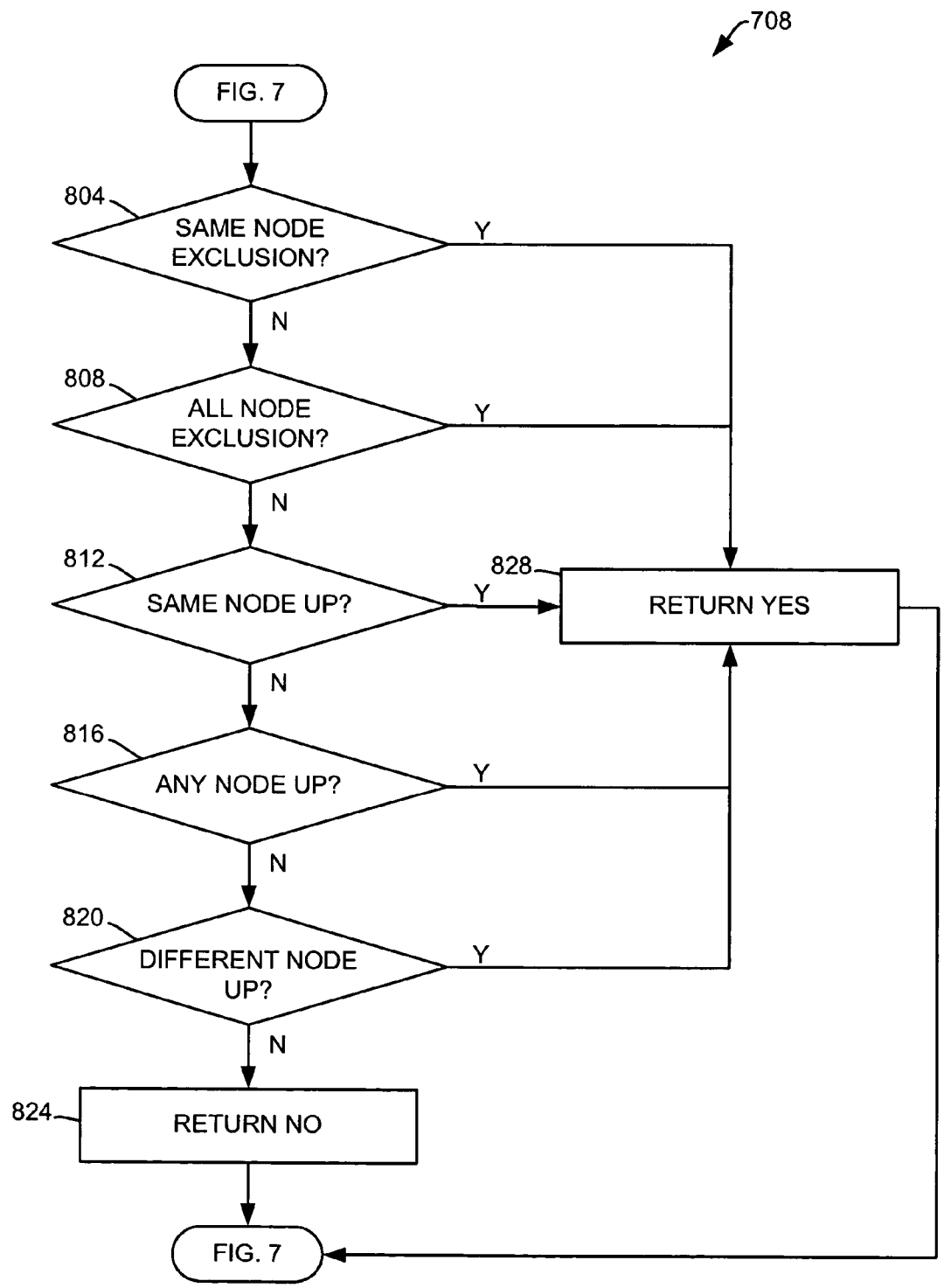
FIG. 8 is a diagrammatic flowchart of methods of determining dependency in accordance with embodiments of the present invention.

FIG. 8 is a diagrammatic flowchart of methods of determining dependency in accordance with embodiments of the present invention. In particular, FIG. 8 represents a further illustration of a step 708 (see FIG. 7). FIG. 8 represents example user-specified package dependencies as embodied in the present invention. At a first step 804, the method determines whether a same node exclusion dependency is specified. A "same node exclusion dependency" is a dependency whereby a given package requires that a selected package is DOWN on the same node in the cluster. However, the selected package may be UP on another, different node in the cluster. If the method determines that a same node exclusion dependency is specified, the method returns a yes at a step 828, whereupon the method returns to FIG. 7.

If the method determines that a same node exclusion dependency is not specified, the method continues to a step 808 to determine whether an all node exclusion dependency is specified. An "all node exclusion dependency" is a dependency whereby a given package requires that a selected package be DOWN on the same cluster. If the method determines that an all node exclusion dependency is specified, the method returns a yes at a step 828, whereupon the method returns to FIG. 7.

If the method determines that an all node exclusion dependency is not specified, the method continues to a step 812 to determine whether a same node UP dependency is specified. A "same node UP dependency" is a dependency whereby a given package requires that a selected package be UP on the same node in the cluster. If the method determines that a same node UP dependency is specified, the method returns a yes at a step 828, whereupon the method returns to FIG. 7.

If the method determines that a same node UP dependency is not specified, the method continues to a step 816 to determine whether an any node UP dependency is specified. An "any node UP dependency" is a dependency whereby a given package requires that a selected package be UP on any node in the cluster. If the method determines that an any node UP dependency is specified, the method returns a yes at a step 828, whereupon the method returns to FIG. 7.

If the method determines that an any node UP dependency is not specified, the method continues to a step 816 to determine whether a different node UP dependency is specified. A "different node UP dependency" is a dependency whereby a given package requires that a selected package by UP on a different node in the cluster. If the method determines that a different node UP is specified, the method returns a yes at a step 828, whereupon the method returns to FIG. 7. If the method determines that a different node UP dependency is not specified, the method returns a no whereupon the method returns to FIG. 7.

Figure 9:
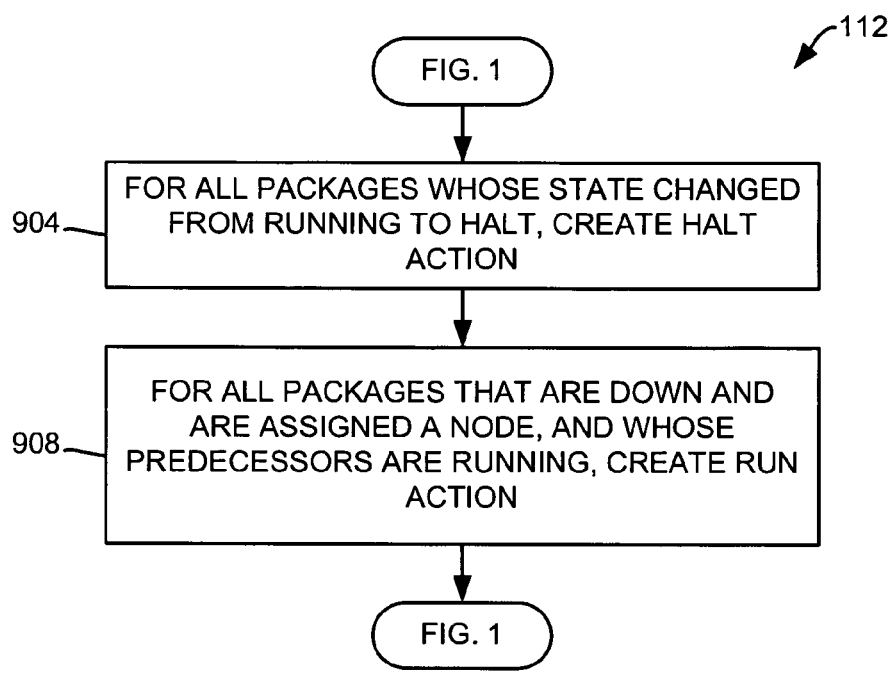
FIG. 9 is a diagrammatic flowchart of methods of creating an action in accordance with embodiments of the present invention.

FIG. 9 is a diagrammatic flowchart of methods of creating an action in accordance with embodiments of the present invention. In particular, FIG. 9 represents a further illustration of a step 112 (see FIG. 1). At a first step 904, for all packages whose state changed from running to halt, create a halt action. Thus, if a package, in the course of being processed, is marked for halt due to any number of programmatic constraints described herein, the method initiates a halt action for that package. At a next step 908, for all packages that are: a) DOWN, b) assigned a node, and c) in a state where its predecessors are running, create a run action. Thus, a package that has all programmatic constraints fulfilled may be run. The method then returns to FIG. 1 whereupon the method iterates to a step 104.

Figure 10:
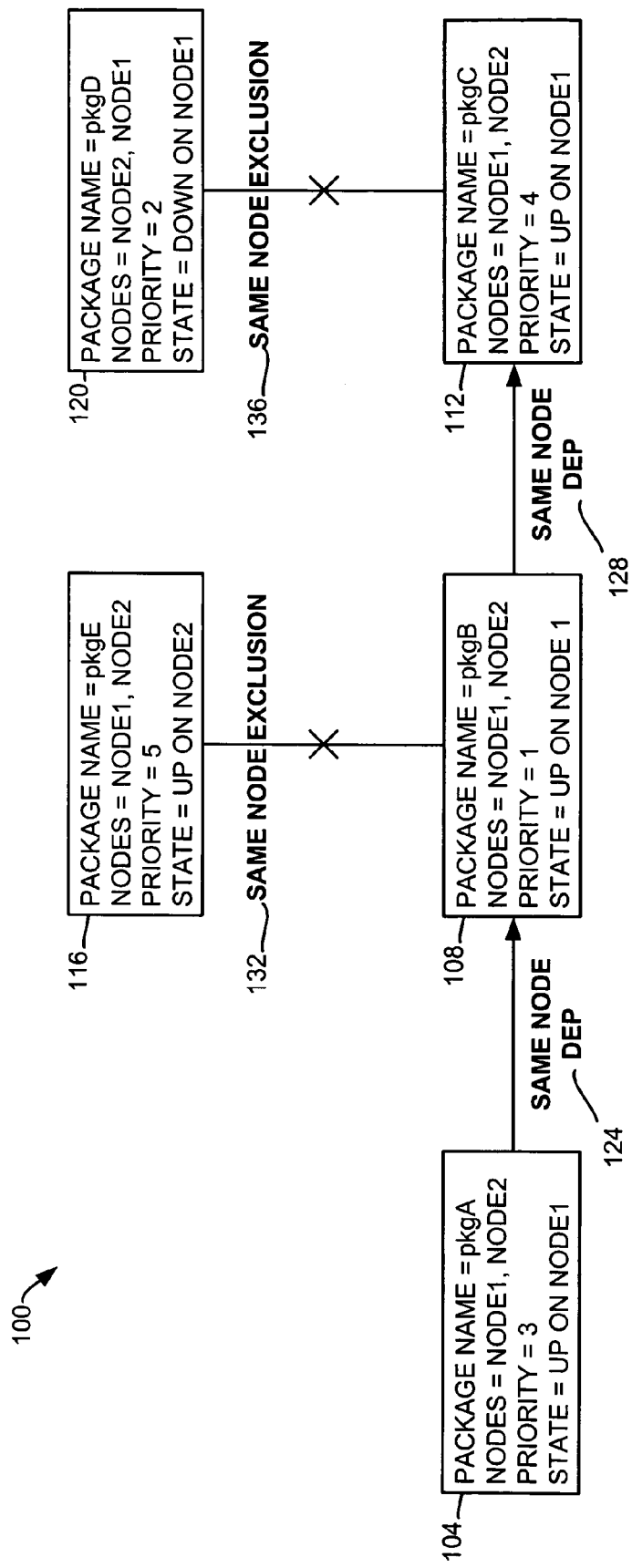
FIG. 10 is a diagrammatic representation of a programmatic package dependency graph in accordance with embodiments of the present invention.

FIG. 10 is a diagrammatic representation of a programmatic package dependency graph in accordance with embodiments of the present invention. A programmatic package dependency graph as illustrated may be desirable, in some embodiments, to provide a rapid graphical context in which to view a cluster configuration. As such, a number of packages 104-120 are illustrated. Referring to package 104, a package name, node eligibility, package priority, and state are included. In particular, for package 104: package name is "pkgA;" node eligibility is "NODE1" and "NODE2;" package priority is 3; and current state is UP ON NODE1. Also illustrated is a user-specified package dependencies 124-136. In this illustration, all other packages 108-120 may contain substantially similar elements as described for package 104. As illustrated, package 104 depends on package 108, which, in turn, depends on package 112 as denoted by dependencies 124 and 128. Furthermore, package 116 is same node exclusion dependent with respect to package 108. Likewise, package 120 is same node exclusion dependent with respect to package 112. FIG. 10 illustrates an example configuration that may be achieved using the methods described herein.

It may be noted that package 108 includes a package priority of 1. In this example, package 108 has the highest (strongest) priority. It may be appreciated that the designation of a particular number or letter context to represent priority may be employed without departing from the present invention. Because of package 108's high package priority, it may supercede other package having lower package priorities after a given state change. For example, if package 108 failed on NODE1, then it might be transferred to NODE2, an alternate eligible node. Because package 108's high package priority, it may bring down package 116 running on NODE2 because of the same node exclusion dependency and because package 108's package priority is higher than package 116's package priority. In this example, package 116 may, in some instances, be brought up on NODE1, an alternate eligible node. Furthermore, because package 108 is dependent on package 112 and 108's package priority is higher than package 112, package 112 will be "dragged" to NODE2 in order to accommodate package 108's configuration requirements. As can be appreciated, package priority enables a user to describe which package's configuration will control a configuration or reconfiguration process as described in embodiments herein.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of placing at least one programmatic package in response to a state change in a clustered computing system comprising:

receiving, performed by a computer system, a state change, wherein the state change is selected from a group consisting of: a package failure, a node failure, a cluster failure, a system failure, a hardware failure, a software failure, a network failure, a system command, and a state change command;

in response to the receiving the state change, ordering, performed by the computer system, the at least one programmatic packages, each of the at least one programmatic packages configured with a package priority, the package priority representing a user designated assignment of programmatic importance from high to low;

assigning a user-specified package dependency selected from a group consisting of: a same node exclusion dependency, an all node exclusion dependency, a same node up dependency, an any node up dependency, and a different node up dependency to each of the at least one programmatic package, wherein the user-specified package dependency specifies a dependency between two or more programmatic packages with respect to one or more nodes in the clustered computing system, wherein all nodes in the clustered computing system behave like a single computer by working together;

placing, performed by the computer system, the at least one programmatic package having a highest package priority on a configured node, the configured node included as part of the clustered computing system; and for each of a remaining of the at least one programmatic packages, placing, performed by the computer system, each of the remaining of the at least one programmatic packages on a node set in accordance with a user-specified package dependency, the node set included as part of the clustered computing system.

2. A non-transitory computer readable storage medium having computer-readable program instructions stored thereon for use in conjunction with a computer system for placing at least one programmatic package in response to a state change in a clustered computing system, the computer program product comprising:

instructions for receiving a state change, wherein the state change is selected from a group consisting of: a package failure, a node failure, a cluster failure, a system failure, a hardware failure, a software failure, a network failure, a system command, and a state change command;

in response to the receiving the state change, instructions for ordering the at least one programmatic packages, each of the at least one programmatic packages configured with a package priority, the package priority representing a user designated assignment of programmatic importance from high to low;

instructions for placing the at least one programmatic package having a highest package priority on a configured node, the configured node included as part of the clustered computing system; and for each of a remaining of the at least one programmatic packages, instructions for placing each of the remaining of the at least one programmatic packages on a node set in accordance with a user-specified package dependency selected from a group consisting of: a same node exclusion dependency, an all node exclusion dependency, a same node up dependency, an any node up dependency, and a different node up dependency, the node set included as part of the clustered computing system, wherein the user-specified package dependency specifies a dependency between two or more programmatic packages with respect to one or more nodes in the clustered computing system, wherein all nodes in the clustered computing system behave like a single computer by working together.

* * * * *